April 13, 1965 F. R. HOLT 3,178,514

DYNAMIC LIMITER FOR STEREOPHONIC BROADCAST RECEIVER

Filed Sept. 14, 1960

INVENTOR.
FRANCIS R. HOLT

BY Eugene M. Whitacre

ATTORNEY

1

3,178,514
DYNAMIC LIMITER FOR STEREOPHONIC BROADCAST RECEIVER

Francis Raymond Holt, Willow Grove, Pa., assignor to Radio Corporation of America, a corporation of Delaware Filed Sept. 14, 1960, Ser. No. 55,881
12 Claims. (Cl. 179—15)

This invention relates to signal amplitude limiting circuits, and more particularly to limiter circuits for stereophonic radio signal receiving systems for selecting and translating carrier waves or signals of the type which are amplitude modulated in accordance with one of a pair of stereophonically-related sound signals, and concurrently angle or frequency modulated in accordance with the other of said pair of stereophonically-related signals.

The stereophonically-related sound signals, designated as A and B signals, for modulating the carrier wave or signal for each transmission channel may be derived from any suitable dual-channel stereophonic signal source, such as a pair of spaced microphones at an original program source, or the dual output channels of a stereophonic tape or phonograph record player. In this type of stereophonic signal transmission, the A and B signals may be subtracted to form an $(A-B)$ signal which is used to angle modulate the carrier wave, and the A and B signals may also be added to form an $(A+B)$ signal which is used to amplitude modulate the angle-modulated carrier wave. A conventional monophonic (AM) radio receiver may then receive the modulated signal and detect the $(A+B)$ sound signal as conventional amplitude modulation.

A stereophonic receiver for such modulated carrier waves includes circuits for demodulating both the amplitude-modulation component and the angle-modulation component thereof to derive the $(A+B)$ and $(A-B)$ signals, respectively. To obtain the individual A and B signals, the $(A+B)$ and $(A-B)$ signals are added and subtracted in a suitable matrixing circuit or network. The resultant signals are then amplified in separate A and B, or left and right, stereophonic signal channels of the receiver and reproduced in stereophonic relation through individual spaced, left and right, loudspeaker means for the respective signal channels.

The automatic-gain-control (AGC) circuits in such broadcast receivers do not provide complete adjustment for carrier wave signal strength or amplitude variations. Therefore the amplitude of the $(A+B)$ signal from the (AM) envelope detector may vary as the received carrier signal level changes. Also the received signal level at the (AM) envelope detector may vary from one broadcast signal to another, or from station to station, even with automatic gain control, or be subject to fading, and thus the amplitude or tracking relation of the derived $(A+B)$ and $(A-B)$ signals, may likewise vary.

It will be seen that if the derived $(A+B)$ and $(A-B)$ signals are thus unbalanced or changed in relative amplitude by reason of any of the above noted conditions of operation, and thus may not have the same amplitude relation or ratio as the $(A+B)$ and $(A-B)$ signals used to modulate the transmitter, the resultant signals from the matrix network which are reproduced by the receiver sound signal channels will not provide the proper stereophonic effect.

Furthermore it will also be seen that if a static limiter of the type used in known frequency-modulation receivers should be used in the angle-modulation channel of a stereophonic receiver, the $(A-B)$ output signal level would be maintained substantially constant and independent of wide changes in received carrier-wave signal strength. This condition of operation is undesirable because improper matrixing and stereophonic sound reproduction would result as above pointed out.

It is an object of this invention to provide an improved signal amplitude limiting circuit.

It is another object of this invention to provide a stereophonic signal receiver of the type described having improved means for maintaining tracking of the signal output, or a predetermined amplitude ratio between the detected $(A+B)$ and $(A-B)$ signals, from the angle-modulation and amplitude-modulation channels thereof, through variation of the $(A-B)$ output signal amplitude in response to variations of the mean level of the received signal at the input circuit of the (AM) envelope detector for the $(A+B)$ signal.

Therefore, in accordance with the invention a receiver for a carrier wave signal modulated in both angle or frequency and amplitude with stereophonic information, such as A and B or $(A+B)$ and $(A-B)$ sound signals, is provided with separate amplitude and angle or frequency-modulation signal channels in which the angle or frequency-modulation channel includes a grid-bias limiter circuit followed by an angle-modulation or frequency-modulation detector circuit. Variation in the output $(A-B)$ signal level of the angle-modulation detector circuit is provided by control circuit means connected with the limiter circuit to track the output $(A+B)$ signal of the (AM) envelope detector circuit in amplitude as the signal strength of the received and translated carrier wave varies, and thereby to prevent the matrixing errors referred to hereinbefore, which might otherwise result. Specifically, in the angle or frequency-modulation signal channel, a diode rectifier, subject to a variable control potential, is connected with the grid-bias limiter grid or input circuit to control the level or amplitude of the positive signal peaks applied thereto and make the channel output $(A-B)$ signal level proportional to the mean level of the input signal or carrier wave.

It is therefore a further object of this invention to provide a limiter circuit in a stereophonic signal receiver for separating the angle-modulation or frequency-modulation component from the amplitude-modulation component of a composite stereophonic angle-and-amplitude modulated carrier wave or signal and for maintaining substantially a constant amplitude relation therebetween which is independent of signal strength variations.

It is also an object of this invention to provide an improved signal amplitude tracking circuit between the amplitude-modulation and the angle-modulation channels of a stereophonic radio receiver of the type described which may utilize and retain the advantages of a grid-bias limiter circuit in the angle-modulation channel while at the same time the output signal amplitude for effective tracking may be controlled by relatively low-cost and efficient diode-rectifier and control-circuit means operating connected in shunt relation to the grid-cathode of the limiter tube.

The invention will, however, be further understood from the following description when considered in connection with the accompanying drawing, and its scope is pointed out in the appended claims.

Figures 1, 2, 3, 5:
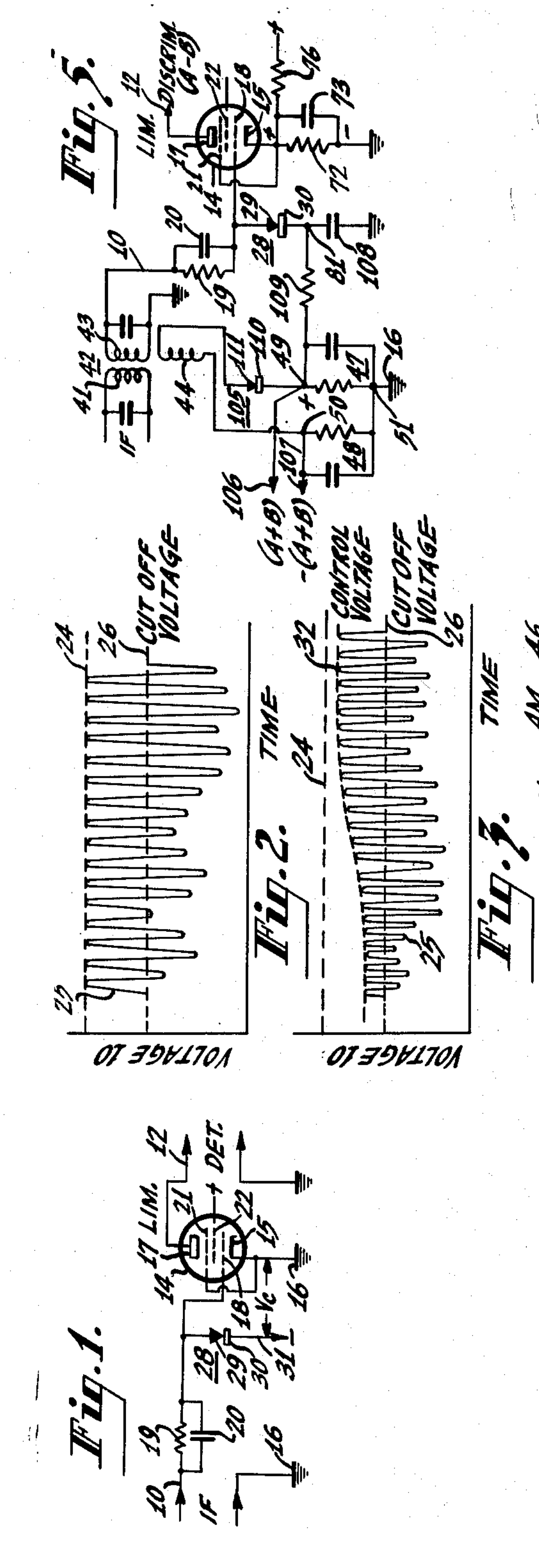
FIGURE 1 is a schematic circuit diagram of a limiter circuit for use in connection with a stereophonic radio signal receiver in accordance with the invention.
FIGURES 2 and 3 are graphs showing signal response curves illustrating certain operating or control characteristics of the circuit of FIGURE 1 in accordance with the invention.
FIGURE 5 is a schematic circuit diagram showing a modification of a portion of the circuit of FIGURE 4, in accordance with the invention.

Referring to the drawing, in which like reference numerals are applied to like elements throughout the various figures, and referring particularly to FIGURE 1, a limiter amplifier circuit for the angle or frequency-modulation channel of a stereophonic radio signal receiving system or receiver of the type described is shown connected between an input circuit 10, to which intermediate frequency signals are applied, and an output circuit 12 for connection with an angle or frequency-modulation detector or demodulator, as hereinafter shown. The limiter is of the electron-discharge or electronic-tube type comprising a pentode tube 14 having a cathode 15 connected to common ground or chassis 16 for the system and an output anode 17 suitably coupled to the output circuit 12. The input circuit 10 is connected with an input or control grid 18 through a series grid resistor 19 provided with a shunt grid capacitor 20. The suppressor grid 21 of the pentode is connected with the cathode as is the usual practice, and the screen grid 22, between the suppressor grid and the control grid, is operated of a positive potential.

Referring to FIGURE 2 along with FIGURE 1, a grid-bias limiter, as shown, can be considered as operating in the following manner: The grid-cathode diode 18–15 sets the positive peaks of the applied intermediate-frequency signal at the grid at a fixed D.C. potential which is approximately that of the cathode 15 or ground. The signal then goes negative from this potential.

In FIGURE 2, the cathode potential in the graph is indicated by the dotted line 24 and the intermediate-frequency signal is indicated by the signal wave-form 25 as shown on the time-voltage co-ordinates. If the intermediate-frequency signal on the grid 18 is sufficiently large, it will swing more negative or beyond the cut-off voltage for the tube in the negative direction, as shown by the position of the wave-form 25 with respect to the cut-off voltage level indicated by the dotted line 26. The signal at the anode of the output circuit 12 of the limiter will be an amplifier version of that part of the signal at the grid 18 which lies within the grid base of the tube, that is, between the cathode potential limit 24 and the cut-off voltage limit 26 as depicted in the graph of FIGURE 2. Unlike some limiter circuits, a grid-bias limiter draws very little current in the grid circuits and thus does not cause appreciable phase modulation of the signal which may result in a distorted output signal.

This advantage can be retained and in addition the amplitude of the (IF) signal output of the limiter can be controlled by the use of a diode to set or clamp the positive peaks of the (IF) signal at the grid of the limiter. A diode 28 having its anode 29 connected with the grid 18 of the amplifying limiter 14 and its cathode 30 connected to a negative supply lead 31 and held at a negative D.-C. voltage (Vc) which may be varied in amplitude, with respect to the cathode 15, will set or clamp the positive peaks of the IF potential at the grid 18 at a level approximately that of the applied control voltage, as shown by the graph in FIGURE 3. Only that portion of the (IF) signal wave between the variable negative control voltage level indicated by the dotted line 32 and the amplifier cut-off voltage level 26 will be amplified. In this case, as indicated by the dotted line 32, the positive peaks of the signal wave cannot rise in a positive direction above the control voltage. As the latter is raised in a positive direction, that is, the control lead 31 becomes less negative the signal amplitude at the anode or output circuit 12 increases as shown by the increased amplitude of the signal wave between the cut-off voltage limiter level indicated by the line 32.

Thus in a stereophonic (AM) signal receiver for translating carrier waves or signals which are amplitude modulated in accordance with one of a pair of stereophonically-related signals and concurrently angle or frequency-modulated in accordance with the other of said pair of stereophonically-related signals, a diode with its anode connected to the control grid may be used to control the amplitude of the signal applied to the amplifying portion of the grid-bias limiter in the angle or frequency-modulation channel preceding the detector or demodulator means therefor, while the gain of the amplifying device itself is maintained constant.

To vary the amplitude of the detected signal from the angle or frequency-modulation detector or demodulator means as the average amplitude of the signal from amplitude-modulation channel varies due to variations in the strength of the (IF) signal applied thereto, a variable control voltage is applied to the diode as above described to set the positive peaks of the (IF) signal applied to the limiter grid circuit at any desired level and hence to control the output level of the signal applied to the angle or frequency-modulation detector or demodulator means and thereby the level of the demodulated signal without gain adjustment of the tube used as the limiter amplifier device.

In order to obtain an output signal from the demodulator means which is proportional to the mean level of the applied IF signal at the amplitude-modulation detector, the control voltage may be obtained by adding a negative D.-C. potential to a positive potential which increases with signal strength at the (IF) amplifier output circuit or the input circuit to the amplitude-modulation detector circuit. The positive potential may be in the form of an inverted automatic-gain-control (AGC) potential. Alternatively, the ground point of the circuit may be changed so that part or all of the control voltage is applied in an inverted form to the cathode of the limiter tube. Also, the control diode itself may be used to derive the signal dependent part of the control voltage above referred to, as hereinafter shown and described.

An advantage of the circuit of FIGURE 1 over conventional grid-bias limiters is that the percentage that a signal is limited is relatively constant over a wide range of signal levels. Thus even very weak signals which might not be limited in conventional limiter circuits will be limited in the circuits of the invention because the potential difference between the control and cut-out voltage is reduced for weak signals. In the limiter circuit of FIGURE 1, the resistor 19 and shunt capacitor 20 in the grid circuit are normally selected to provide a time constant such that a grid-leak bias is developed across the resistor 19 in response to applied signals for operation as a grid bias limiter. The resistor 19 normally serves as a series impedance element for holding the bias voltage on the grid.

Figure 4:
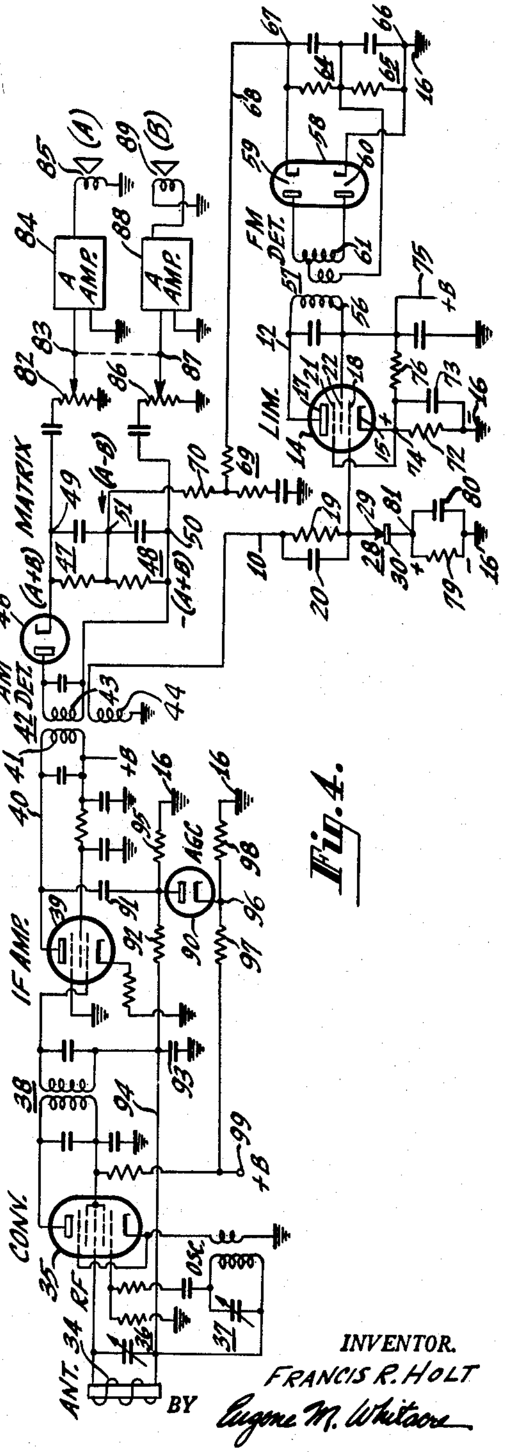
FIGURE 4 is a schematic circuit diagram of a stereophonic radio signal receiver provided with a limiter and control circuit therefor embodying the invention.

The diode control of the grid-bias limiter as shown in the circuit of FIGURE 1 can be applied in a stereophonic (AM) receiver to separate the angle or frequency-modulation component from the amplitude-modulation component while retaining a substantially constant amplitude relationship or ratio between them, independent of the signal strength of the applied signal at the amplitude modulation detector or at the output circuit of the (IF) amplifier connected therewith. A circuit arrangement for incorporating such a control circuit in a typical receiver for operation in accordance with the invention, is shown in FIGURE 4 to which attention is now directed.

The substantially conventional stereophonic two-channel receiver illustrated includes signal pickup means represented by a loop antenna 34 which is coupled to converter means including a converter tube 35 which, with its associated tuned and coupled RF and oscillator circuits 36 and 37 respectively, develops an intermediate-frequency (IF) signal which is applied through an (IF) coupling transformer 38 to an (IF) amplifier including an amplifier tube 39 having an output circuit 40. The output circuit is connected with the tuned primary winding 41 of an (IF) output coupling transformer 42 which has a secondary winding 43 and a tertiary winding 44.

The (IF) output coupling transformer provides for dividing the amplitude modulation and the angle or frequency-modulation channels in the receiver. In the present example the secondary winding 43 is tuned to the intermediate frequency and connected to the amplitude-modulation channel and the envelope detector therein which includes a diode 46. The amplitude-modulation detector circuit includes the diode connected in series with first and second envelope detector load circuits 47 and 48 across the tuned secondary 43. The load circuits are in the form of the usual resistor-capacitor networks. The load circuit 47 provides the $(A+B)$ modulation component at an output terminal 49 while the $-(A+B)$ modulation component of an applied signal is provided at an output terminal 50 for the load circuit 48. As is customary with this type of envelope detector, the two load circuits 47 and 48 are effectively serially connected between the terminals 49 and 50 and provide a common terminal 51 at the junction thereof.

The tertiary winding 44, which is substantially a duplicate of the secondary winding 43 is connected with the angle or frequency-modulation channel. This winding may be untuned as shown and with one end connected to chassis or common ground 16 for the system. The opposite end of the winding 44, is connected to the angle or frequency-modulation channel through the input circuit 10 of a limiter amplifier comprising the limiter tube 14, the diode 28 and the output circuit 12, for receiving frequency-modulation signals from the tertiary winding 44 and transmission to the output circuit 12. The latter is coupled to the tuned primary winding 56 of a discriminator transformer 57 which drives a conventional balanced angle or frequency-modulation detector 58. The detector 58 includes a pair of diodes 59 and 60 with their anodes connected with opposite ends of the tuned secondary winding 61 of the discriminator transformer 57. The load circuit for the diodes 59 and 60 comprise a pair of resistor-capacitor networks 64 and 65 connected in series between the cathodes of the diodes 59 and 60. One terminal 66 of the load circuit is connected to chassis or common ground 16 for the system, and the other end terminal 67 of the load circuit is connected through an output circuit 68 and a de-emphasis network 69 with the junction of the envelope detector load circuits 47 and 48 at the terminal 51. A series isolating resistor 70 is connected between the de-emphasis network 69 and the terminal 51 as shown.

The limiter circuit, as shown in FIGURE 4, includes the series grid resistor 19 and shunt capacitor 20 in the input circuit 10 connected to the input grid 18 to which is also connected the anode 29 of the control diode 28 as in the preceding embodiment. A grid 18, cathode 15 biasing voltage for the tube 14 is derived from sources including a series cathode resistor 72 provided with a bypass capacitor 73 and connected between a positive terminal 74 at the cathode 15 and common ground or chassis 16 for the system as shown. Additional current is applied to the resistor 72 in the cathode circuit, from the anode and screen supply positive lead of the system indicated at 75, through a series limiting resistor 76. Thus, a fixed negative biasing voltage is provided by the resistor 72 and the current flow therethrough, and may be selected so that the limiter is substantially cut-off in the absence of signals.

The control diode 28 is connected to ground through signal-dependent control voltage source comprising a resistor 79 and shunt capacitor 80. In the present example, the diode 28 conducts on the positive peaks of the applied signal and provides the signal-variable portion of the control voltage across the resistor 79 which represents the average signal amplitude by reason of a relatively long time constant provided by the shunt capacitor 80.

With no signal applied, the tube 14 is substantially cut-off, and no control voltage is developed across the resistor 79 capacitor 80 combination. With respect to the graph of FIGURE 3, both the cut-off voltage and control voltage may be assumed to be zero. As the applied signal amplitude increases, the signal-dependent control voltage at the terminal 81 increases in a positive direction. As shown in FIGURE 3, this causes the control voltage line 32 to be raised above the substantially fixed cut-off voltage line 26, thereby permitting a greater portion of the signal output from the secondary 44 to be applied through the limiter 14 to the output circuit 12 and the angle or frequency-modulation detector 58. The $(A-B)$ output signal from the discriminator network at the terminal 67 is applied through the output circuit 68, the de-emphasis network 69, and the series isolating resistor 70, to the matrixing circuit at the terminal 51 where it is added and subtracted to provide the A signal component at the output terminal 49 and the —B signal component at the output terminal 50.

The channel A sound signals from the output terminal 49 are translated through a separate output circuit or channel which includes a gain-control potentiometer 82 having a variable control contact 83 connected to a suitable channel amplifier 84, which, in turn, is coupled to sound-reproducing or loudspeaker means 85 for the channel. Likewise the channel B sound signals from the output terminal 50 are translated through a second output circuit or channel which includes a second gain-control potentiometer 86 having a variable control contact 87 connected with a suitable channel amplifier 88 which, in turn, is coupled to the channel sound-reproducing or loudspeaker means 89. To phase the —B signal with that of the A channel, polarity reversal is provided as indicated.

It will be noted that the receiving system includes automatic-gain-control (AGC) means comprising a diode rectifier 90 coupled through a capacitor 91 to the (IF) signal output circuit 40 and connected through a filter resistor 92, provided with a shunt filter capacitor 93, to the automatic-gain-control circuit 94 for the converter 35 and (IF) amplifier 39. The load resistor for the (AGC) diode 90 is shown at 95 and is connected to chassis or common ground as indicated. A terminal 96 for the diode cathode is raised above ground in a positive direction to provide delayed automatic-gain-control action by a connection with an intermediate point on a voltage divider comprising two series bleeder resistors 97 and 98 connected between the +B supply lead 99 for the receiver and common or chassis ground 16. The automatic-gain-control means shown represents any suitable delayed (AGC) means for the common signal translating-circuits of the receiver.

The (A+B) or amplitude-modulation channel output will increase with signal strength. A corresponding increase in the output of the angle-modulation signal channel is here provided for proper tracking and matrixing. As previously explained, the action of the diode 28 and signal responsive control voltage source 79 and 80 permits the amplification of a greater portion of the applied signal, as the signal level increases, and conversely reduces the amount of applied signal for decreases in signal level. Thus the amplitude of the signal output from the angle or frequency-modulation channel changes in proper tracking relation to the amplitude of the signal output from the amplitude-modulation channel, whereby the stereophonic sound reproduction from the channel speakers 85 and 89 remain in proper balance. With this system, the output of the angle or frequency-modulation channel is made effectively proportional to the mean level of the input signal at the audio or amplitude-modulation detector.

This function may be obtained by a modification of the limiter circuit as shown in FIGURE 5, wherein the signal-dependent part of the control voltage is effectively inverted automatic-gain-control (AGC) voltage. The limiter 14 for the angle-modulation signal channel is coupled to the tuned secondary winding 43 of the IF output transformer 42, while the amplitude-modulation detector is provided by a second diode 105 coupled to the tertiary winding or secondary 44 which may be untuned. The diode 105 replaces the diode 46 as the amplitude-modulation (AM) detector in the present modification, and is connected with the series load or output circuits 47 and 48 with the common terminal 51 connected directly to chassis ground 16. The terminals 49 and 50 are connected to matrixing circuits (not shown) through the respective (A+B) and −(A+B) output circuits 106 and 107. The output circuit 12 of the limiter is also connected to a suitable discriminator network (not shown) as in the circuit of FIGURE 4. In the present example the cathode resistor 72 and the additional current supplied thereto through the resistor 76 operates, as in the preceding example, to provide the negative or fixed biasing voltage for the tube 14 which maintains the tube near cut-off in the absence of applied signals. The control voltage which is responsive to signal amplitude variations, is applied to the terminal 81 at the control diode cathode 30 across a capacitor 108 through a series filter resistor 109 from the positive terminal 49 of the detector output network. The detector diode 105 is poled with its cathode 110 connected to the terminal 49 and its anode 111 connected to the tertiary winding 44.

It will be seen that in response to an increase in the amplitude of the applied signal at the output circuit of the IF amplifier, the diode 105, in rectifying the applied signal, will provide at the terminal 49 an increase in positive potential on the diode 28 increasing the amount of signal applied to the control grid 18 of the limiter 14 and increasing the signal output therefrom in proportion to that from the amplitude-modulation channel as hereinbefore described. Thus in this modification, means are provided for controlling the signal applied to the grid-bias limiter, in response to an effectively inverted AGC voltage, whereas in the circuit of FIGURE 4, the control diode per se is used to derive the signal-dependent part of the control voltage $V_c$ in its own directly connected load circuit.

From the foregoing description it will be seen that in a stereophonic radio signal receiving system of the type having amplitude and angle or frequency-modulation signal translating channels, the output signal amplitude from the angle or frequency-modulation channel may be caused to vary with the mean level of the input or intermediate-frequency signal applied to the amplitude-modulation envelope detector through a simple, low-cost, and effective circuit arrangement including diode control and variable-bias limiter means in the angle or frequency-modulation channel, which functions to provide substantially automatic tracking between the channel signal output levels, whereby the two stereophonically-related signals may be reproduced in substantially the same balanced amplitude relation as provided for modulation at the transmitter or source.

Having described the invention, what is claimed is:

1. In a receiving system for carrier signals modulated in angle and in amplitude with stereophonic signal information, means providing separate amplitude and angle-modulation signal translating channels, an electronic-tube grid-bias limiter circuit and an angle-modulation detector circuit coupled therewithin the angle-modulation-channel, an amplitude-modulation envelope detector circuit in the amplitude-modulation channel, and a control circuit for varying the amplitude of the detected signal from the angle-modulation detector circuit as the average amplitude of the amplitude-modulation detector circuit output signal varies due to variations in signal strength at said detector circuit to maintain a predetermined tracking relation in the amplitudes of the channel output signals for matrixing and reproduction in stereophonic form, said last named means including a diode connected to control the positive peaks of signals applied to the grid-bias limiter circuit and to the angle-modulation detector circuit coupled thereto, said diode having a cathode and having an anode connected to the input grid of the limiter amplifier tube, and means for holding said cathode at a signal-variable negative direct-current control voltage with respect to the cathode of the tube to clamp the positive peaks of the applied signal at the tube grid at a level approximately that of the control voltage and limit the signal output to the variable control voltage level, thereby to effect said tracking relation.

2. In a receiving system for carrier signals modulated in both angle and amplitude with stereophonic signal information, the combination with means for selecting said carrier signals, of means providing separate amplitude and angle-modulation signal channels having a common intermediate-frequency signal supply circuit connected with said signal selecting means, amplitude-modulation detector means in said amplitude-modulation signal channel, a grid-bias limiter circuit coupled with an angle-modulation detector circuit in said angle-modulation signal channel, a diode connected with the grid-bias limiter circuit, and means connected with said diode for applying a direct-current control voltage thereto which varies with and in proportion to the average amplitude of the input signal at said intermediate-frequency signal supply circuit to control the level of the positive signal peaks applied to the limiter circuit and the signal output level of the angle-modulation signal channel and thereby maintain a predetermined tracking relation in the amplitudes of the channel output signals for matrixing and reproduction in stereophonic form.

3. In a radio receiving system for carrier signals modulated in both angle and amplitude, the combination with means for selecting said carrier signals, of means providing amplitude and angle-modulation signal translating channels having a common signal supply circuit connected with said signal-selecting means, amplitude-modulation detector means in said amplitude-modulation signal channel subject to variations in signal strength for deriving an amplitude-modulation signal component of corresponding variable amplitude from said supply circuit, a grid-bias limiter circuit and an angle-modulation detector circuit coupled therewith in said angle-modulation signal channel for deriving an angle-modulation signal component from said signal supply circuit, a diode connected with the grid-bias limiter circuit, and a control circuit for said diode providing a signal-variable control voltage for maintaining the level of the positive signal peaks applied thereto and the angle-modulation channel output signal component in predetermined tracking relation to said amplitude-modulation signal component.

4. In a radio receiving system for carrier signals modulated in both angle and amplitude with stereophonic signal information, the combination of means providing amplitude and angle-modulation signal translating channels having a common modulated signal supply circuit, amplitude-modulation detector means in said amplitude-modulation signal channel for deriving an amplitude-modulation signal component of variable amplitude from said supply circuit, a grid-bias limiter circuit and an angle-modulation detector circuit coupled therewith in said angle-modulation signal channel for deriving an angle-modulation signal component from said signal supply circuit, said limiter circuit including an electronic amplifier tube having an input grid and a cathode, a diode having an anode connected with the grid of said amplifier tube and having a cathode, and a control circuit for the diode connected between the diode cathode and the tube cathode comprising negative direct-current potential supply means in series with signal-variable positive direct-current potential supply means providing a variable negative control potential on said diode cathode with respect to the tube cathode to control the level of the positive signal peaks applied to the limiter grid and the angle-modulation channel output signal level in amplitude tracking relation to said amplitude-modulation signal component.

5. In a stereophonic radio receiver for carrier signals modulated in angle and in amplitude with stereophonic (A and B) sound signals information, means including a branched intermediate-frequency amplifier circuit providing separate amplitude $(A+B)$ and angle-modulation $(A-B)$ signal translating channels, a grid-bias limiter circuit including an electronic amplifier tube having an input grid and a cathode, an angle-modulation detector circuit following and coupled with said limiter circuit in the angle-modulation-channel, an amplitude-modulation envelope detector circuit in the amplitude-modulation channel, and a control circuit for varying the amplitude of the detected $(A-B)$ signal from the angle-modulation detector circuit to maintain a predetermined tracking relation in the amplitudes of the channel output signals for matrixing and reproduction in stereophonic (A and B) form, said control circuit including a diode connected to control the positive peaks of intermediate-frequency signals applied to the grid-bias limiter circuit and to the angle-modulation detector circuit coupled thereto, said diode having a cathode and having an anode connected to the input grid of the limiter amplifier tube, means for holding the diode cathode at a negative D.-C. control voltage with respect to the cathode of the limiter amplifier tube thereby to clamp the positive peaks of the applied intermediate-frequency signal at the tube grid at a level approximately that of the control voltage and limit the signal output to the variable control voltage level above the cut-off voltage of the tube, and means for varying said control voltage in a positive direction in response to increases in the average amplitude of the applied signal at said intermediate-amplifier circuit to effect said tracking relation.

6. In a stereophonic radio receiver for carrier signals modulated in angle and in amplitude with stereophonic (A and B) sound signal information as defined in claim 5, wherein the variable D.-C. control voltage is made to comprise a substantially fixed negative-potential portion which is added, in a bias-circuit connected between the limiter tube cathode and input grid through the diode, to a positive potential portion which increases with signal strength at said intermediate-frequency amplifier circuit.

7. In a stereophonic radio receiver for carrier signals modulated in angle and in amplitude with stereophonic (A and B) sound signal information as defined in claim 6, wherein the positive potential portion of the control voltage is derived from a load circuit including a load resistor and shunt smoothing capacitor connected directly in series relation with the control diode.

8. In a stereophonic radio signal receiver for carrier signals modulated in angle and amplitude, the combination with carrier signal selector and converter means having an intermediate-frequency signal output circuit, of an amplitude-modulation envelope detector and a signal-component matrixing circuit connected therewith providing an amplitude-modulation signal translating channel coupled with said intermediate-frequency output circuit, a limiter amplifier coupled with an angle-modulation detector providing an angle-modulation signal translating channel, said limiter amplifier having a signal input circuit coupled to the signal output circuit of said intermediate-frequency amplifier, a diode connected in shunt relation with said input circuit for controlling the positive signal peaks applied thereto, means responsive to the signal amplitude of applied signals at said amplitude-modulation detector providing a variable biasing potential for said diode whereby substantially automatic tracking is provided between the average output signal levels of the amplitude and angle-modulation channels of said receiver, and means coupling the angle-modulation signal channel with said matrixing circuit to apply the angle-modulation signal output thereto and provide stereophonically-related output signals from said matrixing circuit, and means for amplifying and reproducing said output signals.

9. In a radio signal receiver for translating carrier signals amplitude modulated in accordance with one of a pair of stereophonically-related signals and concurrently angle modulated in accordance with the other of said stereophonically-related signals, means providing an angle-modulation signal channel including angle-modulation detector means having signal input and output circuits and a grid-bias limiter amplifier coupled to the input circuit for controlling the applied signal amplitude, said limiter being of the electron-tube type having a control grid and a cathode, a diode having a cathode and an anode and having the anode connected to said control grid, and means responsive to the average amplitude of applied signals for applying a variable positive control voltage to the cathode of said diode to set the positive peaks of an applied signal at the limiter grid and control the output level of the signal applied to the angle-modulation detector, and means for causing the control voltage to vary in response to the variations in the signal level applied to the amplitude-modulation detector.

10. In a stereophonic radio signal receiving system for carrier wave signals modulated in both angle and amplitude with stereophonic information, the combination with signal selecting and amplifying means including an intermediate-frequency amplifier having an output circuit, of means providing an amplitude-modulation signal translating channel coupled to said output circuit and including an amplitude-modulation envelope detector having a dual-channel sound-signal output circuit for two stereophonically-related signals with sound-signal amplifying and reproducing means therein, means providing an angle-modulation signal-translating channel coupled to the intermediate-frequency amplifier output circuit and including a grid-bias limiter circuit including an electronic tube having a cathode and a control grid followed by an angle-modulation detector circuit, means for matrixing the signal output from said angle-modulation detector circuit with the signal output from said amplitude-modulation detector to provide a predetermined dual-channel stereophonic signal output, and control circuit means connected with the limiter circuit to track the output signal amplitude of the angle-modulation detector circuit with the output signal amplitude of the amplitude-modulation detector as the signal strength of a received carrier wave varies at the intermediate-frequency amplifier output circuit, thereby to maintain the matrixing of said signals in stereophonic relation in said dual-channel sound-signal output circuit of the receiving system, said control circuit means including a diode having a cathode and having an anode connected to the control grid of said electronic tube, and means for applying a variable positive control voltage responsive to said signal strength variations to said diode cathode to control the output level of the signal applied to the angle-modulation detector circuit.

11. A limiter circuit including:

an amplifier device having input, output and common electrodes;

an output circuit coupled between said output and common electrodes;

an input circuit coupled between said input and common electrodes;

circuit means including a rectifier and a resistance-capacitance time constant network coupled between one of said input and common electrodes and a point of reference potential, the poling of said rectifier and the time constant of said time constant network being such as to clamp the peak amplitudes of signal waves in one polarity direction at a potential related to the level of the waves applied to said input circuit; and means for applying a control voltage to the other of said input and common electrodes, said control voltage being of a polarity to prevent conduction between said input and common electrodes to fix the cut-off level of said limiter circuit.

12. A limiter circuit as defined in claim 11 wherein said rectifier and resistance-capacitance time constant network are direct current conductively connected between said input and common electrodes.

References Cited by the Examiner

UNITED STATES PATENTS

| | | | |
|---|---|---|---|
| 2,171,636 | 9/39 | Seeley | 325—482 |
| 2,273,934 | 2/42 | Campbell | 325—480 X |
| 2,286,442 | 6/42 | Schock | 328—171 |
| 2,434,929 | 1/48 | Holland | 328—171 |
| 2,512,530 | 6/50 | O'Brien et al. | 179—15 |
| 2,624,837 | 1/53 | Loughlin | 330—140 |
| 2,698,379 | 12/54 | Boelens | 179—15 |
| 2,785,303 | 3/57 | Keizer | 325—482 |
| 3,013,151 | 12/61 | Adams et al. | 325—349 |

DAVID G. REDINBAUGH, *Primary Examiner.*

ROBERT H. ROSE, *Examiner.*